United States Patent [19]

Gunn

[11] 4,259,098

[45] Mar. 31, 1981

[54] FILTERING APPARATUS WITH SEALING MEANS OPERATED FROM OUTSIDE THE FILTER CHAMBER

[75] Inventor: Charles A. Gunn, Gibsonia, Pa.

[73] Assignee: Mine Safety Appliances Company, Pittsburgh, Pa.

[21] Appl. No.: 168,600

[22] Filed: Jul. 14, 1980

[51] Int. Cl.³ .............................................. B01D 46/00
[52] U.S. Cl. ....................................... 55/478; 55/504; 55/509
[58] Field of Search ................. 55/478, 480, 481, 504, 55/507, 509, DIG. 9, 429, 357

[56] References Cited

U.S. PATENT DOCUMENTS

| 2,403,416 | 7/1946 | Vandegriff | 55/478 |
|---|---|---|---|
| 3,360,910 | 1/1968 | Soltis | 55/509 |
| 3,581,478 | 6/1971 | Smith | 55/509 |
| 4,023,944 | 5/1977 | Beane | 55/481 |
| 4,193,844 | 3/1980 | Neumann et al. | 55/484 |

*Primary Examiner*—Bernard Nozick
*Attorney, Agent, or Firm*—Brown, Flick & Peckham

[57] ABSTRACT

The bottom wall of a filter housing is provided with a flow opening and the top of the housing has an access opening normally closed by a cover. A partition wall in the housing is provided with a passage to permit a filter to be moved into and out of the space below that wall. The side of the housing has a flow opening below the partition wall. A filter in the housing engages the bottom wall around its flow opening, with the top of the filter spaced below the partition wall passage. The partition wall is provided around its passage with threaded holes, into each of which is screwed a threaded portion of a shaft having a head at its upper end for turning it, and a foot at its lower end beside the filter. The outer end of a push bar is rotatably mounted on the lower end portion of the shaft adjacent its foot, and the inner ends of the bars overlap the top of the filter. The shafts are provided with means for pressing the bars down against the filter when the shafts are turned by their heads to move them downwardly, and when the shafts are rotated in the opposite direction the pressure of the bars against the filter is released and the bars are swung away from the filter.

7 Claims, 3 Drawing Figures

FILTERING APPARATUS WITH SEALING MEANS OPERATED FROM OUTSIDE THE FILTER CHAMBER

When a filter installed in a pressure vessel or other type of filter housing is to be removed, it is not unusual to provide for pulling the filter into a plastic bag in order to shield the workman from exposure to radioactivity or harmful chemicals that the filter may have collected. Such a bag is sealed around the filter withdrawal opening of the housing, and the workman grasps the filter through the bag and pulls it into the bag, which is then sealed before being disconnected from the housing. The use of such a plastic bag makes it necessary to hold the filter in position in the housing by a sealing mechanism that can be operated, without disturbing the bag, either to clamp the filter in place or to release it for removal.

It is among the objects of this invention to provide filtering apparatus in which a filter can be clamped into sealing position within a housing and released therefrom by means operable while the filter remains isolated from the operator.

The invention is illustrated in the accompanying drawings, in which

Figure 2:
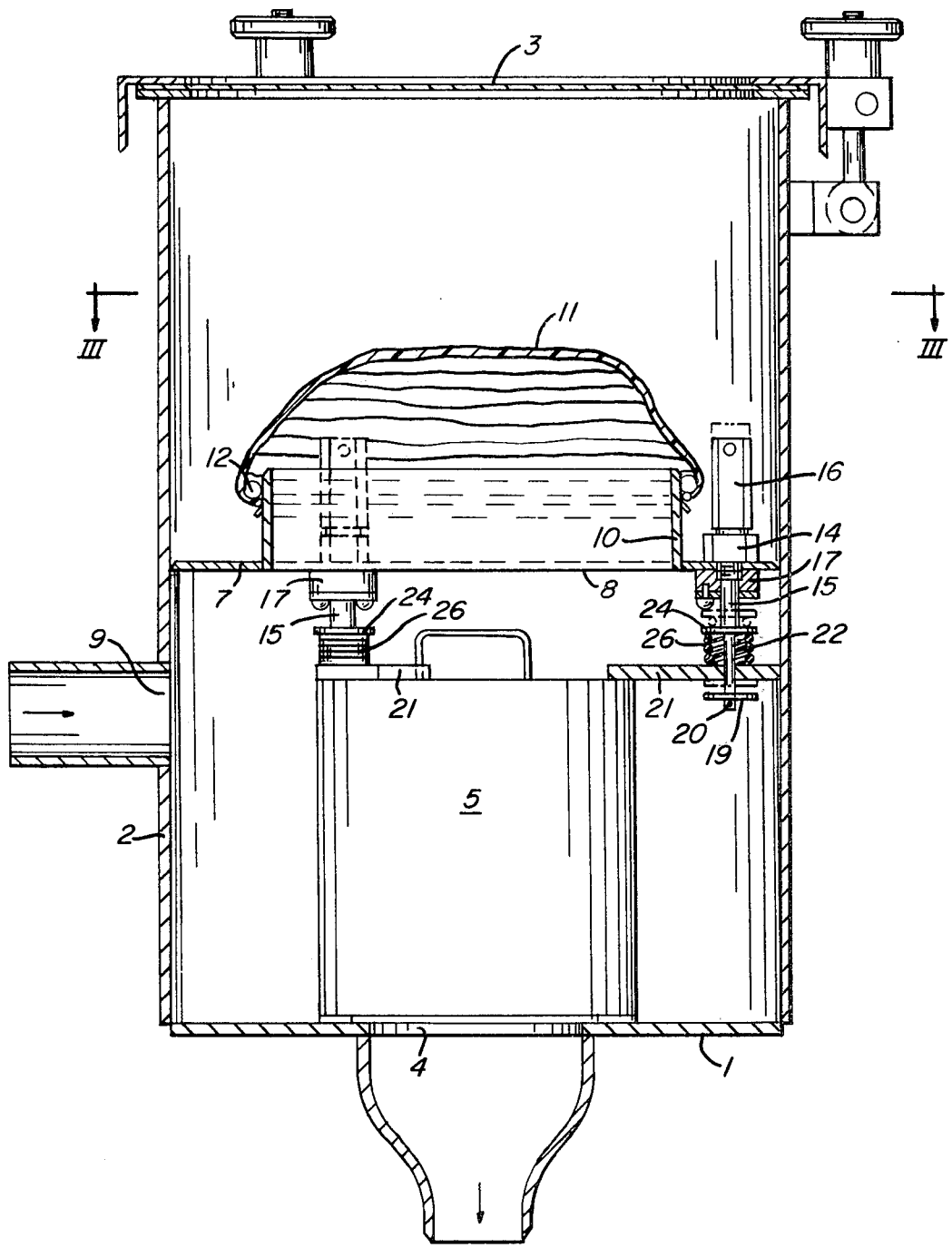
FIG. 2 is a vertical section taken on the line II—II of FIG. 1.

Referring to the drawings, a filter housing is shown with a bottom wall 1 and a side wall 2 extending upwardly and provided with an access opening at its upper end normally closed by a cover 3 clamped in place in any suitable manner. The housing may be cylindrical or some other shape. In the bottom wall of the housing, as shown in FIG. 2, there is a central gas flow opening 4 that normally is covered by a filter 5 seated on the bottom wall around the opening. If the housing is cylindrical, the filter likewise will be cylindrical. Since there may be only a single filter as shown, or two or more filters stacked on top of one another, the term "filter means" will be used in the claims to cover both situations.

Some distance below the top of the housing, but spaced above the filter, there is a partition wall 7 provided with a central passage 8 that is larger in diameter than the filter so that the filter can be inserted in the filter chamber below the partition wall. The side wall of the housing below the partition is provided with an opening 9 for flow of gas into or out of the filter chamber and through the filter. Passage 8 is encircled by an upstanding flange 10 that, in turn, is shown encircled and tightly engaged by the open end of a plastic bag 11 in preparation for removal of the filter. The open end of the bag is stretched around the flange directly below a ring 12 that encircles the flange and is welded to it.

It is a feature of this invention that while bag 11 remains in place as shown, the means by which the filter is being pressed into sealing engagement with the bottom wall of the housing can be operated to release the filter so that it can be lifted up into the bag for removal. Accordingly, at circumferentially spaced points around flange 10 the partition wall is provided with threaded holes through it. To form the threaded holes the partition includes threaded nuts 14 welded to it. Preferably, there are three or more of these nuts spaced uniformly around the central flange. Extending through each of the threaded holes is a threaded portion of a shaft 15 that is screwed into the nut. The upper end of the shaft above the nut has a head 16, by which the shaft can be turned in order to screw it up or down in the partition wall. As the shaft moves vertically, it slides through an encircling sealing device 17 attached to the bottom of the partition wall.

Figure 1:
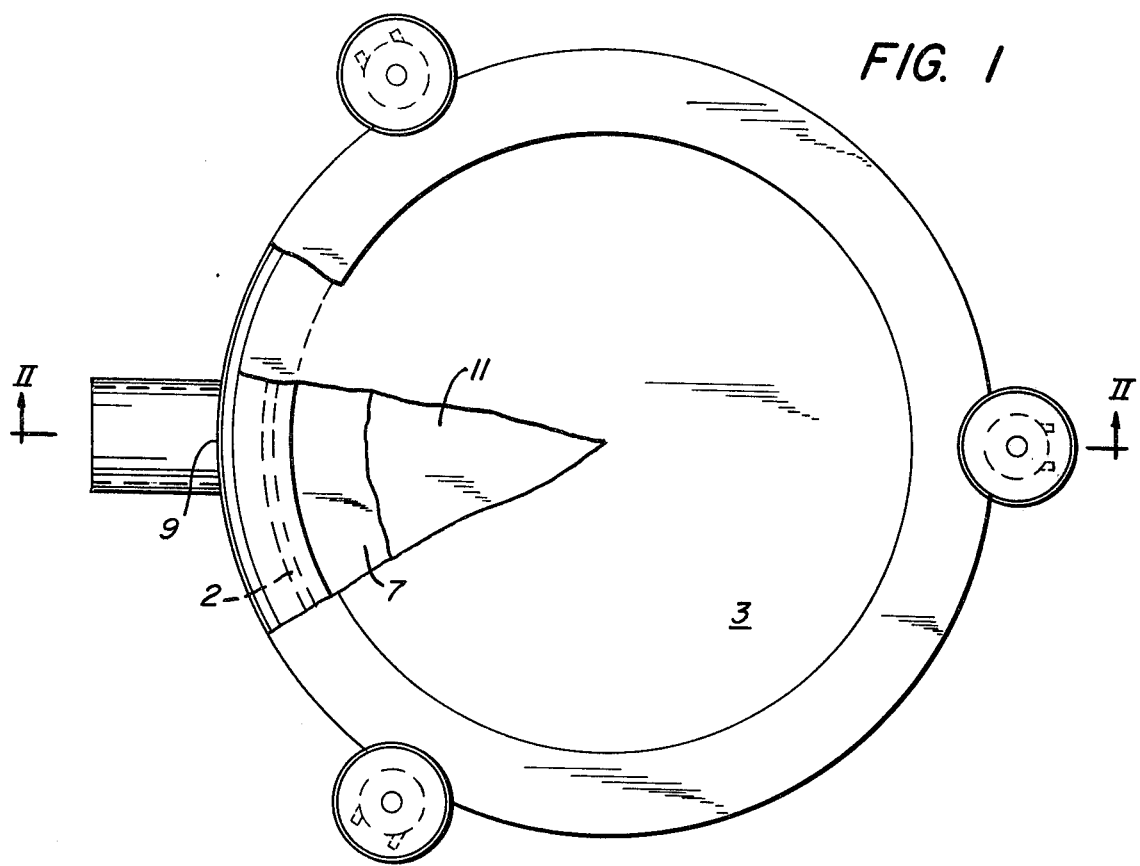
FIG. 1 is a plan view with parts broken away.
Figure 3:
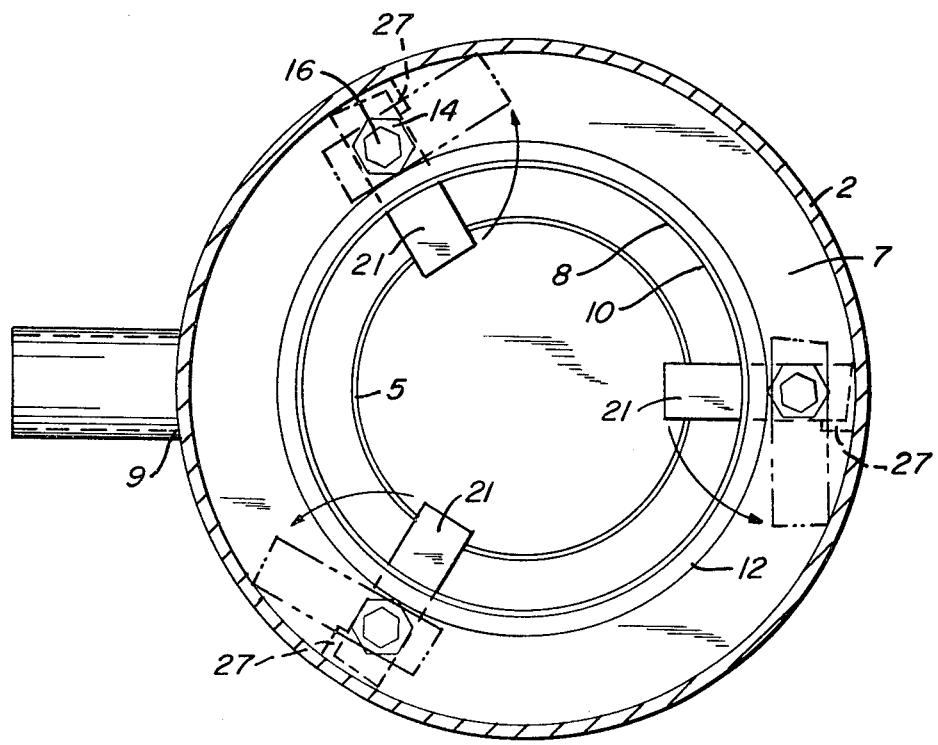
FIG. 3 is a horizontal section take on the line III—III of FIG. 2, but with the plastic bag omitted for the sake of cleaners.

The lower end of each shaft is located beside the upper end of the filter and is provided with a laterally projecting foot that can be formed in any suitable manner. The foot shown in FIG. 2 is formed by a washer 19 held on the shaft by an underlying cotter pin 20. Directly above this foot the shaft extends rotatably through the outer end of a push bar 21. The bar includes an upwardly extending collar 22 encircling the shaft for a short distance. The bar can slide up and down on the shaft a limited distance between washer 19 and an enlargement on the shaft. One way of forming this enlargement is to provide the shaft with a downwardly facing shoulder that engages the top of another washer 24 engageable by the upper end of collar 22. Each push bar is long enough for its inner end to overlie the marginal area of the top of the filter as shown in FIG. 3.

For assured reliability, it is best that each collar 22 be encircled by a coil spring 26 that is compressed between washer 24 and the portion of the push bar projecting laterally from the lower end of the collar. When the bar is not engaging the filter, the pressure of the spring causes the bar to press against the foot of the shaft (washer 19) so that when the shaft is turned while in its upper position it will be sure to swing the inner end of the bar laterally into filter-overlying position as shown. Movement of the bar past this position is prevented by engagement of the outer end of the bar with a stop 27 (FIG. 3) projecting inwardly from the side wall of the housing. With the inner end of the bar in position over the filter, further turning of the shaft will screw it downwardly and cause washer 24 to engage the top of collar 22 and then press the bar down tightly on the filter. The foot of the shaft will move down away from the bar. The pressure of all of the push bars against the filter will hold the filter tightly against the bottom wall of the housing.

When it is desired to release the filter, the shafts 15 are turned in the reverse direction. As each shaft moves upwardly, its coil spring will hold the push bar stationary until the foot of the shaft engages the bar and starts to lift it. The spring pressure of the bar against the foot will create enough friction between them to assure that further turning of the shaft will swing the bar away from the filter, as shown by the arrows and dotted lines in FIG. 3, so that it can be removed from the filter chamber and top of the filter housing.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Filtering apparatus comprising a filter housing having a bottom wall and a side wall extending upwardly therefrom, the bottom wall being provided with a flow opening and the top of the housing having an access opening, a cover normally closing said access opening, a partition wall in said housing and provided with a passage therethrough to permit filter means to be moved into and out of the chamber below the partition wall, the side of the housing being provided with a flow opening below the partition wall, filter means in said chamber engaging said bottom wall around the flow opening therein, the top of the filter means being spaced below said partition wall passage, the partition wall being provided around said passage with threaded holes, a shaft extending through each threaded hole and having a threaded portion screwed into said hole, the upper end of the shaft having a head for turning it and the lower end of the shaft having a foot beside the filter means, and a push bar having an outer end rotatably mounted on the lower end portion of the shaft adjacent said foot, the inner ends of the bars overlapping the top of the filter means, said shafts being provided with means for pressing said bars down against the filter means when the shafts are turned by their heads to move the shafts downwardly, and said shafts being rotatable by their heads in the opposite direction to release the pressure of the bars from the filter means and to swing them away from the filter means.

2. Filtering apparatus according to claim 1, including a coil spring encircling each shaft and urging the adjoining push bar toward the foot of that bar.

3. Filtering apparatus according to claim 1, including a flange extending upwardly from said partition wall around said passage for supporting a plastic bag used in removing a filter from the housing after said cover has been removed.

4. Filtering apparatus according to claim 1, including stop members engageable by the outer ends of said push bars when the inner ends of the bars overlap the filter means.

5. Filtering apparatus according to claim 1, in which said pressing means includes an enlargement on each shaft overlapping the bar in engagement therewith.

6. Filtering apparatus according to claim 5, in which said inner end portion of each shaft is reduced in diameter to form a shoulder, a washer on the shaft engages the shoulder, and the associated push bar includes an upwardly extending collar encircling the shaft, the upper end of the collar being engageable by said washer to press the bar down.

7. Filtering apparatus according to claim 6, including a coil spring encircling each collar and compressed between the overlying washer and the underlying portion of the push bar.

* * * * *